United States Patent
Jung et al.

[11] Patent Number: 5,978,030
[45] Date of Patent: Nov. 2, 1999

[54] METHOD AND APPARATUS FOR ENCODING A VIDEO SIGNAL USING FEATURE POINT BASED MOTION ESTIMATION

[75] Inventors: Hae-Mook Jung; Min-Sub Lee, both of Seoul, Rep. of Korea

[73] Assignee: Daewoo Electronics Co., Ltd., Seoul, Rep. of Korea

[21] Appl. No.: 08/435,688

[22] Filed: May 5, 1995

[30] Foreign Application Priority Data

Mar. 18, 1995 [KR] Rep. of Korea .......................... 95-5715

[51] Int. Cl.$^6$ ...................................................... H04N 7/32
[52] U.S. Cl. ........................... 348/416; 348/699; 382/241; 382/243
[58] Field of Search ..................................... 348/416, 699, 348/700, 402, 415, 409, 401, 400, 390, 384; 382/236, 238, 241, 243

[56] References Cited

U.S. PATENT DOCUMENTS

| | | | |
|---|---|---|---|
| 5,235,419 | 8/1993 | Krause | 348/416 |
| 5,241,608 | 8/1993 | Fogel | 348/699 |
| 5,295,201 | 3/1994 | Yokohama | 348/416 |
| 5,317,397 | 5/1994 | Odaka et al. | 348/416 |
| 5,481,310 | 1/1996 | Hibi | 348/413 |

*Primary Examiner*—Tommy P. Chin
*Assistant Examiner*—Bryan S. Tung
*Attorney, Agent, or Firm*—Anderson Kill & Olick P.C.

[57] ABSTRACT

An apparatus for encoding a digital video signal to reduce a transmission rate of the digital video signal, which comprises a feature point based motion compensation circuit for selecting a set of feature points from the reconstructed reference frame to detect a set of motion vectors between a current frame and a original reference frame corresponding to the set of feature points by using a feature point based motion estimation, and for generating a second predicted frame based on the set of motion vectors and the reconstructed reference frame. The feature point based motion estimation employs a convergence process in which a displacement of each of the feature points are given to a motion vector thereof and the six triangles of each of the hexagon are affine-transformed independently using the displacements of their vertex feature points. If the displacements provide a better PSNR, the motion vector of the subject feature point is sequentially updated. Therefore, the inventive convergence process is very efficient in the matching process to determine the predicted image as close as possible to the original image having zooming, rotation or scaling of objects.

20 Claims, 9 Drawing Sheets

METHOD AND APPARATUS FOR ENCODING A VIDEO SIGNAL USING FEATURE POINT BASED MOTION ESTIMATION

FIELD OF THE INVENTION

The present invention relates to a method and apparatus for encoding a video signal; and, more particularly, to a method and apparatus for encoding a digital video signal using an improved feature point based motion estimation, thereby effectively reducing the transmission rate of the digital video signal with a good picture quality.

DESCRIPTION OF THE PRIOR ART

As is Well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame or future frame, i.e., a reference frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding reference frame data based on an estimation of the motion between the current and a reference frames. Such estimated motion may be described in terms of two dimensional motion vectors representing the displacement of pixels between the reference and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its reference frame until a best match is determined. From this, an interframe displacement vector (which indicates how much the block of pixels has moved between frames) for the whole block can be estimated for the current frame being transmitted.

Such block matching technique may be employed in predicting P and B frames included in video sequences, as disclosed on *ITU Telecommunication Standardization Sector Study Group 15, Working Party 15/1 Expert's Group on Very Low Bit Rate Visual Telephony*, "Video Codec Test Model, TMN4 Rev1", (Oct. 25, 1994), wherein a P or predictive frame denotes a frame which is predicted from its previous frame (as the reference frame) while a B or bidirectionally predictive frame is predicted from its previous and future frames (as the reference frame). In coding the so-called B frame, in particular, a bidirectional motion estimation technique is employed in order to derive forward and backward displacement vectors, wherein the forward displacement vector is obtained by estimating the movement of an object between a B frame and its previous intra(I) or predictive(P) frame (as the reference frame) and the backward displacement vector is derived based on the B frame and its future I or P frame (as the reference frame).

However, in the block-by-block motion estimation, blocking effects at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vectors to a receiver.

One of the techniques introduced to ameliorate the problem of dealing with the surplus or superfluous transmission data resulting from the pixel-by-pixel approach is a feature point based motion estimation method.

In the feature point based motion estimation technique, motion vectors for a set of selected pixels, i.e., feature points, are transmitted to a receiver, wherein each of the feature points is defined as a pixel capable of representing its neighboring pixels so that motion vectors for non-feature points can be recovered or approximated from those of the feature points in the receiver. In an encoder which adopts the motion estimation based on feature points, disclosed in a copending commonly owned application, U.S. Ser. No. 08/367,520, entitled "Method and Apparatus for Encoding a Video Signal Using Pixel-by-Pixel Motion Estimation", a number of feature points are first selected from all of the pixels contained in the previous frame. Then, motion vectors for the selected feature points are determined, wherein each of the motion vectors representing a spatial displacement between one feature point in the previous frame and a corresponding matching point, i.e., a most similar pixel, in the current frame. Specifically, the matching point for each of the feature points is searched in a search region within the current frame by using a known block matching algorithm, wherein a feature point block is defined as a block surrounding the selected feature point; and the search region is defined as a region within a predetermined area which encompasses the position of the corresponding feature point.

In this case, it would be most desirable or convenient to find only one best matching feature point block over the entire search region corresponding to the selected feature point. Sometimes, however, there may be a plurality of equivalent best matching feature point block found during the feature point matching. As a result, it is difficult to correctly detect a motion vector for the feature point with such correlation between the feature point block and the corresponding search region. Furthermore, poor estimates may result if the search region is not determined in accordance with the spatial displacement between the feature point in the reference frame and a corresponding matching point, i.e., a most similar pixel, in the current frame, to thereby deteriorate the overall picture quality.

SUMMARY OF THE INVENTION

It is, therefore, an object of the invention to provide a method for effectively estimating motion vectors for the feature points, thereby effectively reducing the transmission rate of the digital video signal with a good picture quality.

Another object of the invention is to provide an apparatus, for use in a video signal encoding system, for effectively estimating motion vectors employing a feature point based motion estimation, thereby effectively reducing the transmission rate of the digital video signal with a good picture quality.

Another object of the invention is to provide a video signal encoding system selectively employing an feature point based motion estimation and a block based motion estimation, to thereby effectively improve the overall picture quality.

In accordance with one aspect of the present invention, there is provided a method for detecting a set of motion vectors between a current frame and a reference frame of video signals by employing a feature point based motion estimation approach, wherein the reference frame includes a reconstructed reference frame and an original reference frame, which comprises the steps of:

(a) selecting a set of feature points from pixels contained in the reconstructed reference frame wherein the set of feature points forms a polygonal grid having a plurality of overlapping polygons;

(b) determining a set of quasi-feature points on the current frame based on the set of feature points;

(c) assigning a set of initial motion vectors for the set of quasi-feature points, wherein each of the initial motion vectors is set to (0,0);

(d) appointing one of the quasi-feature points as a subject quasi-feature point, wherein the subject quasi-feature point has N number of neighboring quasi-feature points which form a subject current polygon defined by line segments connecting the subject quasi-feature point and said N number of neighboring quasi-feature points, N being a positive integer;

(e) sequentially adding the initial motion vector of the subject quasi-feature point to M number of candidate motion vectors with to produce M number of updated initial motion vectors, M being a positive integer, wherein said M number of candidate motion vectors cover a predetermined region in the subject current polygon and the initial motion vectors of said neighboring feature points are fixed;

(f) determining a predicted position on the original reference frame for each pixel contained in the subject current polygon based on each of the M number of updated initial motion vectors for the subject quasi-feature point and said N number of the initial motion vectors of the neighboring quasi-feature points;

(g) providing a predicted pixel value for said each pixel based on the predicted position from the original reference frame to form M number of predictive subject current polygons;

(h) calculating the difference between the current polygon and each of the predicted subject current polygons to produce M number of peak signal to noise ratios (PSNR's)

(i) selecting one of the updated motion vectors as a selected updated motion vector, which entails a predicted subject current polygon having a maximum PSNR, to update the initial motion vector of the subject quasi-feature point with the selected updated motion vector;

(j) repeating the steps (d) to (i) until all of the initial motion vectors are updated;

(k) repeating the step (j) until said repeating is carried out for a predetermined number of times; and (n) establishing the set of initial vectors as the set of motion vectors, to thereby determine the set of motion vectors.

In accordance with another aspect of the present invention, there is provided an apparatus, for use in a video encoding system, for detecting a set of motion vectors between a current frame and a reference frame of video signals by employing a feature point based motion estimation, wherein the reference frame includes a reconstructed reference frame and an original reference frame, which comprises:

first selection means for selecting a set of pixels from the reconstructed reference frame as a set of feature points, wherein the set of feature points forms a polygonal grid having a plurality of overlapping polygons;

means for determining a set of quasi-feature points on the current frame corresponding to the set of feature points;

memory means for storing a set of initial motion vectors for the set of quasi-feature points, wherein each of the initial motion vectors is set to (0,0);

second selection means for selecting L number of subject quasi-feature-e points from the set of quasi-feature points, wherein each of the subject quasi-feature points has N number of neighboring quasi-feature points which form a non-overlapping subject current polygon defined by line segments connecting the subject quasi-feature point and said N number of neighboring quasi-feature points, said L and N being positive integers;

adder means for adding the initial motion vector of each of the subject quasi-feature points to M number of candidate motion vectors to generate M number of updated initial motion vectors for each of the subject quasi-feature points, M being a positive integer, wherein said M number of candidate motion vectors cover a predetermined region in each of the non-overlapping subject current polygons and the initial motion vectors of the neighboring feature points for each of the subject quasi-feature points are fixed;

means for determining a predicted position on the original reference frame for each pixel contained in each of the non-overlapping subject current polygons based on each of the updated initial motion vectors and the initial motion vectors of the corresponding neighboring quasi-feature points;

means for obtaining a predicted pixel value from the original reference frame based on the predicted position to thereby form M number of predicted subject current polygons for each of the non-overlapping subject current polygons;

means for calculating the differences between each of the non-overlapping subject current polygons and the corresponding M number of predicted subject current polygons to produce M number of peak signal to noise ratios(PSNR's) for each of the non-overlapping subject current polygons;

third selection means for selecting one of the updated initial vectors, for each of the subject quasi-feature points, as a selected updated initial motion vector which entails the predicted subject current polygon having a maximum PSNR to produce L number of selected updated initial motion vectors;

means or updating the initial motion vector for each of the subject quasi-feature points stored in the memory means with the corresponding selected updated initial motion vector; and means for retrieving the set of initial motion vectors from the memory means as the set of motion vectors when all of the initial motion vectors are updated by a predetermined number of times.

In accordance with another aspect of the present invention, there is provided an apparatus for encoding a digital video signal to reduce the transmission rate of the digital video signal, said digital video signal having a plurality of frames including a current frame and a reference frame, which comprises:

first memory means for storing a reconstructed reference frame of the digital video signal;

second memory means for storing an original reference frame of the digital video signal;

first motion compensation means for detecting a number of motion vectors between the current frame and the reconstructed reference frame by using a block based motion estimation and for generating a first predicted current frame based on the number of notion vectors and the reconstructed reference frame;

second motion compensation means for selecting a set of feature points from the reconstructed reference frame to detect a set of motion vectors between the current frame and the original reference frame corresponding to the set of feature points by using a feature point based motion estimation, and for generating a second predicted frame based on the set of motion vectors and the reconstructed reference frame;

means for selectively providing the number of motion vectors and the first predicted current frame or the set of motion vectors and the second predicted current frame as selected motion vectors and the predicted current frame;

means for transform coding an error signal representing the difference between the predicted current frame and the current frame to produce a transform coded error signal; and means for statistically coding the transform coded error signal and the selected motion vectors to produce an encoded video signal to be transmitted.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
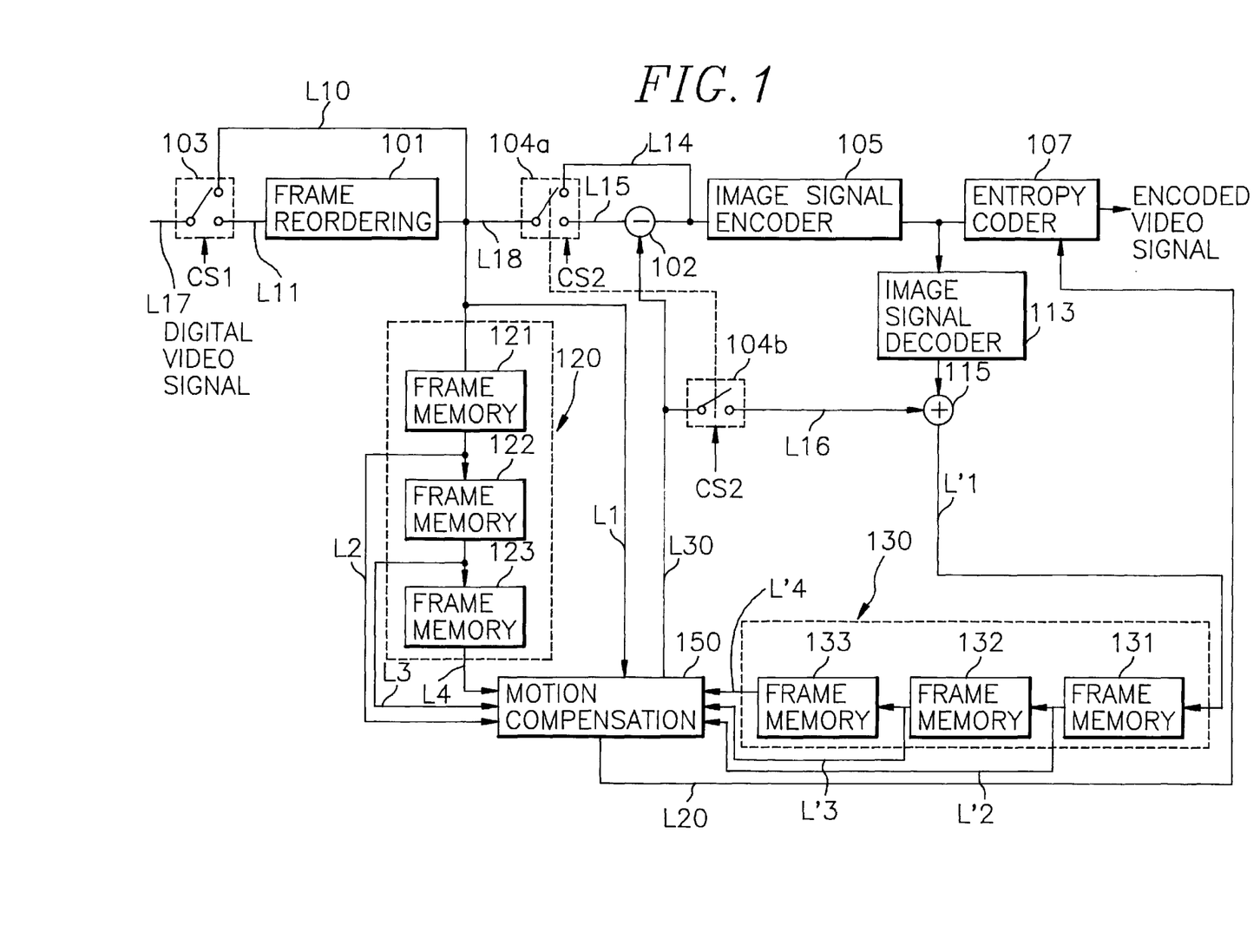
FIG. 1 is an image signal encoding apparatus having a feature point based motion compensation device in accordance with the present invention.

Referring to FIG. 1, there is shown a block diagram of an image encoding system in accordance with the present invention. The image encoding system comprises a frame reordering circuit 101, a subtractor 102, an image signal encoder 105, an image signal decoder 113, an adder 115, a first memory device 120, a second memory device 130, an entropy coder 107 and a motion compensation device 150.

Figure 2A:
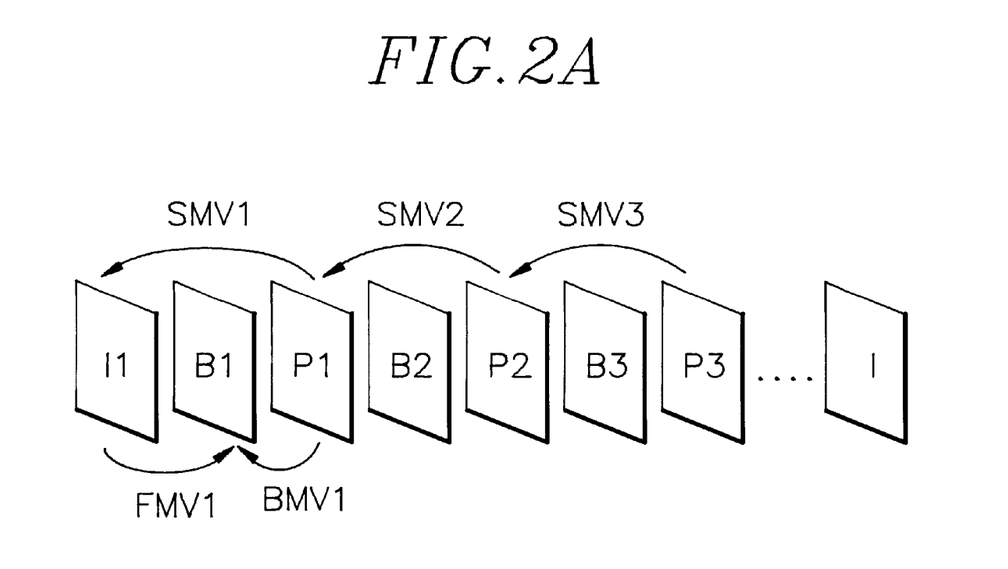
FIGS. 2A and 2B depict schematic diagrams illustrating two frame sequence.
Figure 2B:
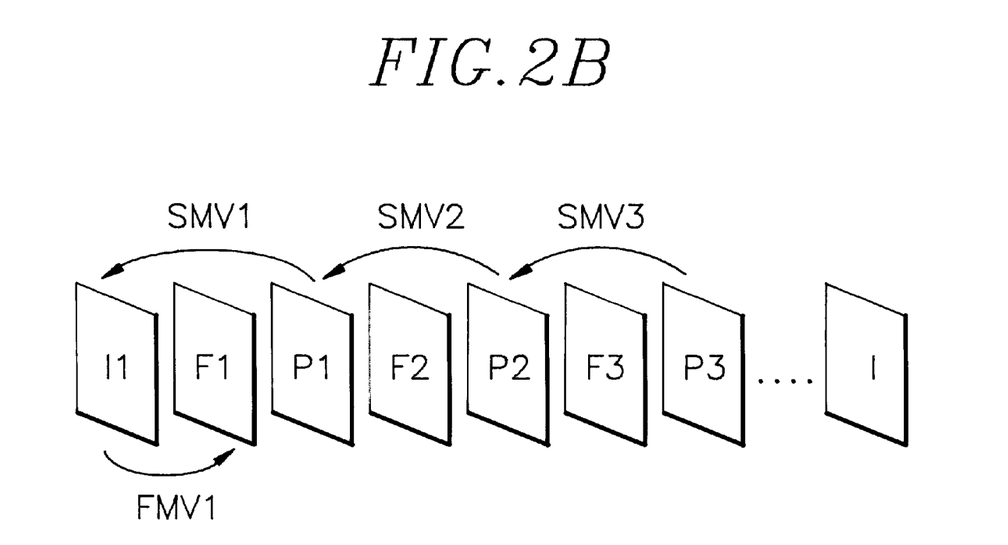

An input digital video signal includes two frame(or picture) sequences as shown in FIGS. 2A and 2B: a first frame sequence is provided with one intra(I) frame, I1, three bidirectionally predictive frames, B1, B2, B3, and three predictive frames, P1, P2, P3; and a second frame sequence has one intra(I) frame, I1, three forwardly predictive frames, F1, F2, F3, and three predictive frames, P1, P2, P3. Therefore, the image coding system includes two sequence coding modes: a first sequence coding mode and a second sequence coding mode.

In the first sequence coding mode, a line L17 is coupled to the line 11 by a first switch 103 and the first frame sequence which includes I1, B1, P1, B2, P2, B3, P3, is applied via the first switch 103 to the frame reordering circuit 101 which is adapted to reorder it into a reordered digital video signal of, e.g., I1, P1, B1, P2, B2, P3, B3 in order to derive bidirectionally predicted frame signals for the B frames. The reordered digital video signal is then provided to a second switch 104a, the first memory device 120 and the motion compensation device 150 via lines L18, L12, L1, respectively.

In the second sequence coding mode, the line L17 is coupled to a line L10 by the first switch 103 and the second frame sequence I1, F1, P1, F2, P2, F3, P3 is coupled via the first switch 103 to the first memory device 120, the motion compensation device 150 and the second switch 104a on the lines L12, L1, L18, respectively. The first switch 103 is actuated by a sequence mode control signal CS1 from a conventional system controller, e.g., a microprocessor(not shown). As can be seen from the above, since there is a reordering delay in the first sequence coding mode, the second sequence coding mode may be advantageously used as a low-delay mode in such an applications as videophone and teleconference devices.

As shown in FIG. 1, the image coding system includes the second switch 104a and a third switch 104b which are used for selectively performing two frame coding modes: an intra frame coding mode and an inter frame coding mode. The second and the third switches 104a and 104b, as well known in the art, are simultaneously actuated by a frame mode control signal CS2 from the system controller.

In the intra frame coding mode, the intra frame I1 is directly coupled as a current frame signal via a line L14 to an image signal encoder 105, wherein the current frame signal is encoded into the set of quantized transform coefficients, e.g., by using a discrete cosine transform (DCT) and any of the known quantization methods. The intra frame I1 is also stored as an original reference frame in a frame memory 121 of the first memory device 120, wherein the first memory device 120 includes three frame memories 121, 122 and 123, which are connected to the motion compensation device 150 through lines L2, L3 and L4, respectively. Thereafter, the quantized transform coefficients are transmitted to an entropy coder 107 and an image signal decoder 113. At the entropy coder 107, the quantized transform coefficients from the image signal encoder 105 are coded together by using, e.g., a variable length coding technique; and transmitted to a transmitter(not shown) for the transmission thereof.

On the other hand, the image signal decoder 113 converts the quantized transform coefficients from the image signal decoder 105 back to a reconstructed intra frame signal by employing an inverse quantization and an inverse discrete cosine transform. The reconstructed intra frame signal from the image signal decoder 113 are then stored as a reconstructed reference frame in a frame memory 131 of the second memory device 130, wherein the second memory device 130 includes three frame memories 131, 132, 133, which are connected to the motion compensation device 150 via lines L'2, L'3, L'4, respectively.

In the inter coding mode, an inter frame (for example, the predictive frame P1, the bidirectionally predictive frame or the forwardly predictive frame F1) is applied as a current frame signal to he subtractor 102 and the motion compensation device 150, and is stored in the frame memory 131 of the first memory device 120, wherein the so called inter frames include the bidirectionally predictive frames, B1, B2, B3, the predictive frames, P1, P2, P3, and the forwardly predictive frames, F1, F2, F3. The original reference frame previously stored in the frame memory 121 is then coupled via the line L2 to the motion compensation device 150, and shifted or stored in the frame memory 122. The motion compensation device 150 includes a block-based motion compensation channel and a feature point based motion compensation channel as described hereinafter.

When the current frame is a predictive frame P1, the current frame signal on the line L1 and a reconstructed reference frame signal on a line L'1 from the frame memory 131 of the second memory device 130 are processed through the use of the block based motion compensation channel to predict the current frame with view of generating the predicted current frame signal onto a line L30 and the set of motion vectors onto a line L20. When the current frame is the forwardly predictive frame F1 (or bidirectionally predictive frame B1), the current frame signal on the line L1, the original reference frame signal on one of the lines L2, L3 and L4 from the first memory device 120 and the reconstructed reference frame signal on one of the lines L'2, L'3 and L'4 from a second frame memory 130 are processed through the use of the feature point based motion compensation channel to predict the current frame to generate a predicted current frame signal onto a line L30 and a set of motion vectors onto a line L20. The motion compensation device 150 will be described in detail with reference to FIG. 3.

The predicted current frame signal on the line L30 is subtracted from a current frame signal on the line L15 at the subtractor 102, and the resultant data, i.e., an error signal denoting the differential pixel value, is dispatched to an image signal encoder 105, wherein the error signal is encoded into a set of quantized transform coefficients, e.g., by using a DCT and any of the known quantization methods. That is, the errors obtained by subtracting the predicted current frame from the current frame are DCT-coded. In such case, the quantizer step size is set to a large value, in order to compensate only the severely distorted region caused by incorrectly estimated motion vectors.

Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the motion compensation device 150 are coded together by using, e.g., a variable length coding technique; and transmitted to a transmitter(not shown) for the transmission thereof.

On the other hand, the image signal decoder 113 converts the quantized transform coefficients from the image signal decoder 105 back to a reconstructed error signal by employing inverse quantization and inverse discrete cosine transform.

The reconstructed error signal from the image signal decoder 113 and the predicted current frame signal on the line L16 from the motion compensation device 150 are combined via the switch 104b at the adder 115 to thereby provide a reconstructed reference frame signal via the line L'1 to be stored as the previous frame in the second frame memory 130.

The frame memory device 130 includes, e.g., the three frame memories 131, 132 and 133 which are connected in series as shown in FIG. 1. That is, the reconstructed frame signal from the adder 115 is first stored in, e.g., the frame memory 131, and then provided to the motion compensation device 150 via the line L'2 and also shifted into the second frame memory 132 on a frame-by-frame basis if the next reconstructed frame signal from the adder 115 is inputted to the first frame memory 131. This process is sequentially repeated as long as the image encoding operation is performed.

Referring to FIGS. 2A and 2B, there are provided exemplary diagrams showing the first and second frame sequences described above. As shown, when the current frame is the predictive frame P1, a set of motion vectors SMV1 is obtained on the block-by-block basis by using the reconstructed intra frame I1 as the reference frame retrieved from the second frame memory 130. In a similar manner, the sets of motion vectors SMV2 and SMV3 for current frames P2 and P3 are obtained using reference frames P1 and P2.

When the current frame is the bidirectionally predictive frame B1, a set of forward motion vectors FMV1 is obtained from the feature points by using the reconstructed reference frame I1 retrieved from the second frame memory 130 and the original reference frame I1 retrieved from the first memory 120. In a similar manner, the set of backward motion vectors BMV1 for the current frame B1 is obtained by using the original reference frame P1 and the reconstructed reference frame P1. Thereafter, the image encode system chooses between the set of forward motion vectors FMV1 and the set of backward motion vector BMV1 and transmits the corresponding motion vectors.

When the current frame is the forwardly predictive frame F1, a set of forward motion vectors FMV1 is obtained from the feature points by using the original reference frame I1 retrieved from the first memory device 120 and the reconstructed reference frame I retrieved from the second memory 130.

As may be seen from the above, for the motion estimation and compensation, the frames contained in the first and the second frame sequence are arranged in the first and the second frame device 120 and 130 as shown in Tables I and II,

TABLE I

The first frame sequence

| L1 | I1 | P1 | B1 | P2 | B2 | P3 | B3 |
|----|----|----|----|----|----|----|----|
| L2 | X | (I1) | △P1 | B1 | △P2 | B2 | △P3 |
| L3 | X | X | (I1) | (P1) | B1 | (P2) | B2 |
| L4 | X | X | X | I1 | (P1) | B1 | (P2) |

TABLE II

The second frame sequence

| L1 | I1 | F1 | P1 | F2 | P2 | F3 | P3 |
|----|----|----|----|----|----|----|----|
| L2 | X | (I1) | F1 | (P1) | F2 | (P2) | F3 |
| L3 | X | X | (I1) | F1 | (P1) | F2 | (P2) |
| L4 | X | X | X | I1 | F1 | P1 | F2 | wherein ○ indicates a frame used for the forward motion estimation and △ denotes a frame used for the backward motion estimation.

As may be seen from the above, the predictive frames P1, P2, P3, are reconstructed by using the DCT based predictive coding, so called TMN4, employing the block based motion estimation; and the intervening frames, i.e., the bidirectionally predicted frames B1, B2, B3, or the forwardly predicted frames F1, F2, F3 are reconstructed by using an improved feature point based motion compensation-discrete cosine transform(MC-DCT) in accordance with the present invention.

Figure 3:
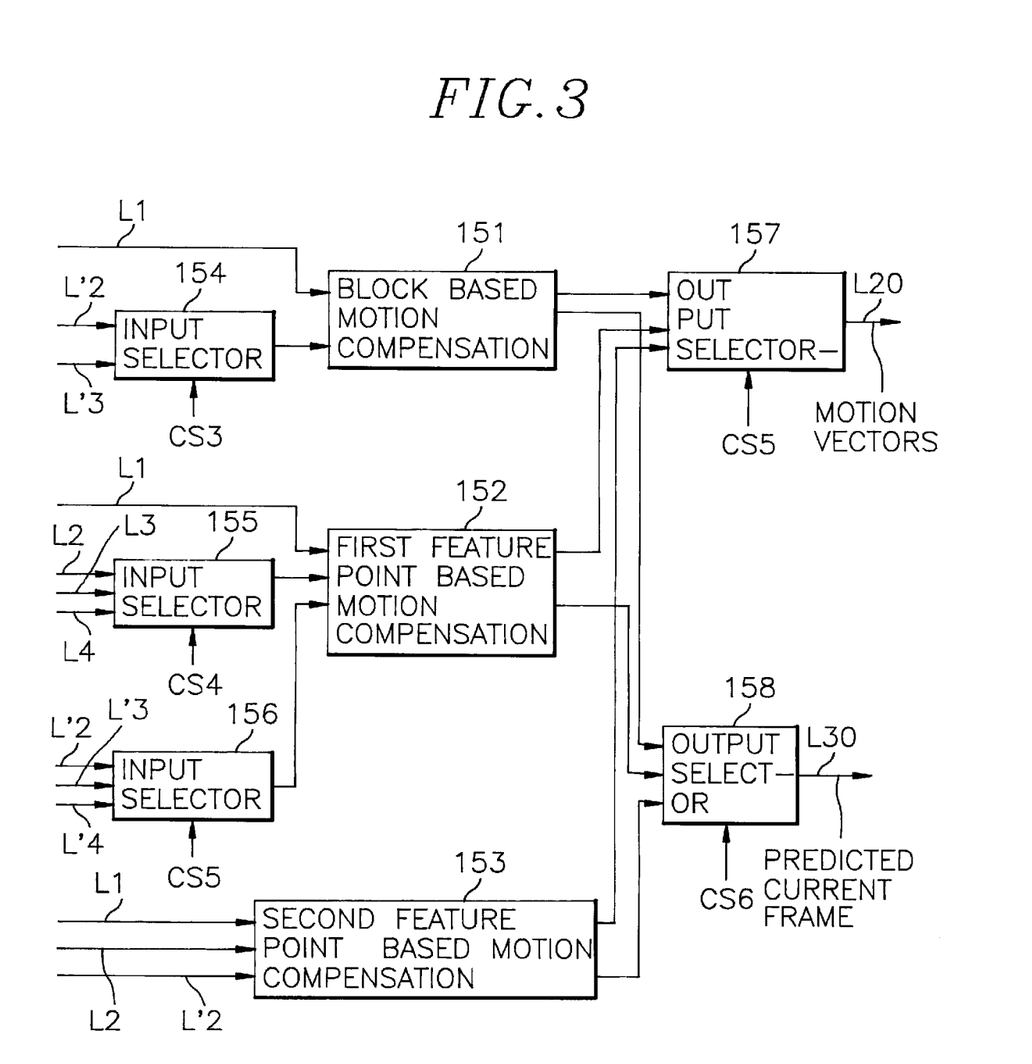
FIG. 3 shows a detailed block diagram of the motion compensation device shown in FIG. 1.

Referring to FIG. 3, there are illustrated details of the motion compensation device 150 shown in FIG. 1. As shown in FIG. 3, the motion compensation device 150 includes input selectors 154, 155 and 156, a block based motion compensation circuit 151, a first feature point based motion compensation circuit 152, a second feature point based motion compensation circuit 153, and output selectors 157 and 158.

The block based motion compensation circuit 151 employing a conventional block matching algorithm serves to detect a set of motion vectors for each of the predictive frames P1, P2, P3; and to generate a predicted current frame for the corresponding predictive frame. Therefore, when the predictive frame P1, as described in Tables I and II, is applied as a current frame to the block based motion compensation circuit 151, the selector 154 serves to couple the reconstructed intra frame I1 on the line L'2 as the reference frame to the block based motion compensation circuit 151. At the block based motion compensation circuit 151, a set of motion vectors is estimated and a predicted current frame signal is constructed therethrough. Thereafter, the set of motion vectors and the predicted current frame signal are respectively coupled via the output selectors 157 and 158 on lines L20 and L30.

The first feature point based motion compensation circuit 152 employing an affine transform as described hereinafter serves to detect a set of forwardly estimated motion vectors for each of bidirectionally predictive frames B1, B2, B3 or the forwardly predictive frame F1, F2, F3 and to generate a predicted current frame for the corresponding bidirectionally or forwardly predictive frame. Therefore, when the bidirectionally predictive frame B1 on the line L1 is applied as the current frame to the feature point based motion compensation circuit 152, the selector 155, as shown in Table I, serves to couple the original intra frame I1 on the line L2 as the original reference frame to the feature point based motion compensation circuit 152. The selector 156 serves to couple the reconstructed intra frame I1 on the line L'2 as the reconstructed reference frame to the feature point based motion compensation circuit 152 to generate the predicted frame. At the first feature point based motion compensation circuit 152, a set of forwardly estimated motion vectors is estimated by using the reconstructed and the original reference frames, and a predicted current frame signal is constructed by using the reconstructed reference frame. Thereafter, the set of forwardly estimated motion vectors and the predicted current frame signal are respectively coupled via the output selectors 157 and 158 on lines L20 and L30, wherein the output selectors 157 and 158 is controlled by control signal CS5 and CS6 from the system controller(not shown).

The second feature point based motion compensation circuit 153 employing an affine transform described hereinafter serves to detect the set of backwardly estimated motion vectors for each of the bidirectionally predictive frames B1, B2, B3 and to generate a predicted current frame for the corresponding bidirectional predictive frame. Therefore, when the bidirectionally predictive frame B1 is applied as the current frame to the second feature point based motion compensation circuit 153, the original predictive frame P1 on the line L2 is coupled as the original reference frame to the feature point based motion compensation circuit 153 and the reconstructed predictive frame P1 on the line L'2 is coupled as the reconstructed reference frame to the second feature point based motion compensation circuit 153. At the second feature point based motion compensation circuit 153, a set of backwardly estimated motion vectors is obtained by using the reconstructed and the original reference frames, and a predicted current frame signal is constructed by using the reconstructed reference frame. Thereafter, the set of backwardly estimated motion vectors and the predicted current frame signal are respectively coupled via the output selector 157 and 158 on lines L20 and L30.

Figure 4:
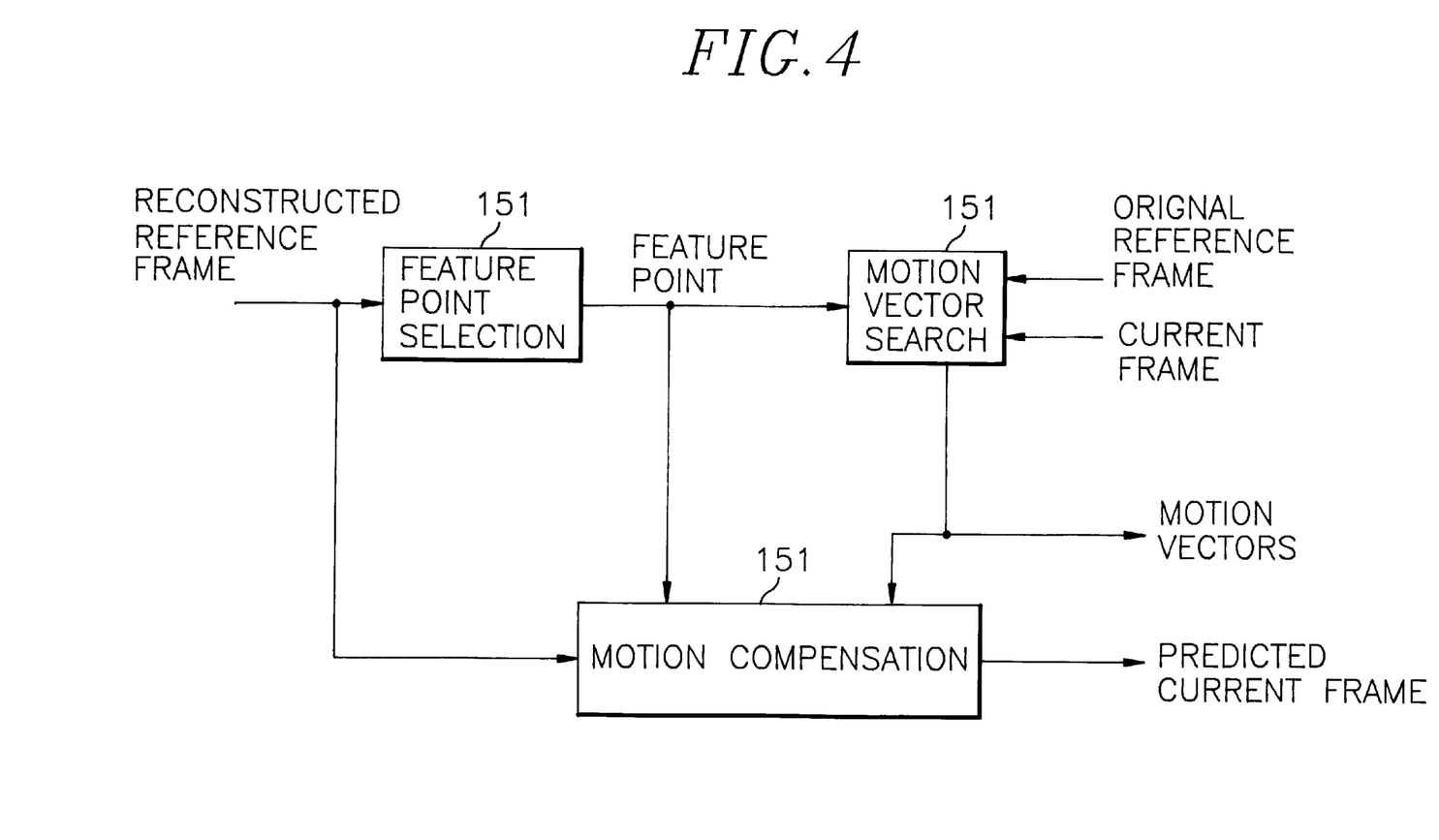
FIG. 4 exhibits an exemplary block diagram of the motion vector search block illustrated in FIG. 3.

Referring to FIG. 4, there are illustrated details of the feature point based motion compensation circuit shown in FIG. 3. A reconstructed reference frame signal on the line L'2 from the second frame memory 130 is inputted to a feature point selection block 210 for generating a set of feature points, and a motion compensation block 240. The set of feature points is then coupled to the motion vector search block 230 and the motion compensation block 240. The motion vector search block 230 receives the original reference frame and the current frame and serves to generate a set of motion vectors for the set of feature points. The set of motion vectors is coupled to the motion compensation block 240 which serves to generate a predicted current frame based on the set of motion vector and the set of feature points.

Figure 5A:
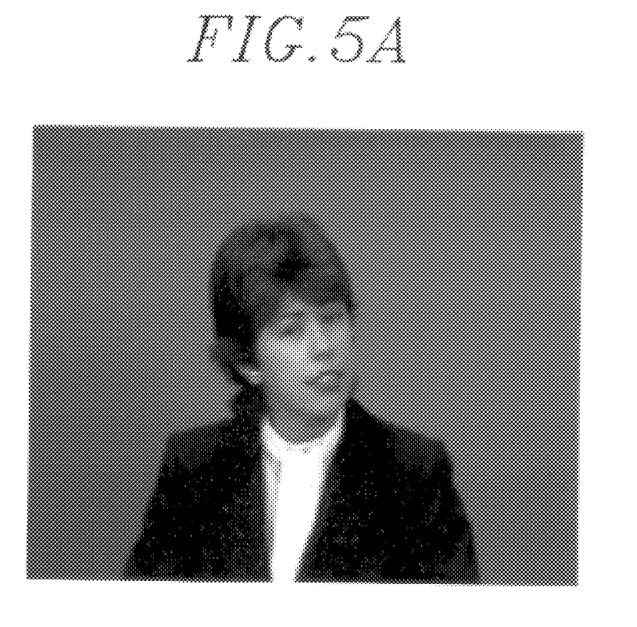
FIGS. 5A and 5B offer an exemplary diagram of the current frame and the reconstructed previous frame.
Figure 5B:
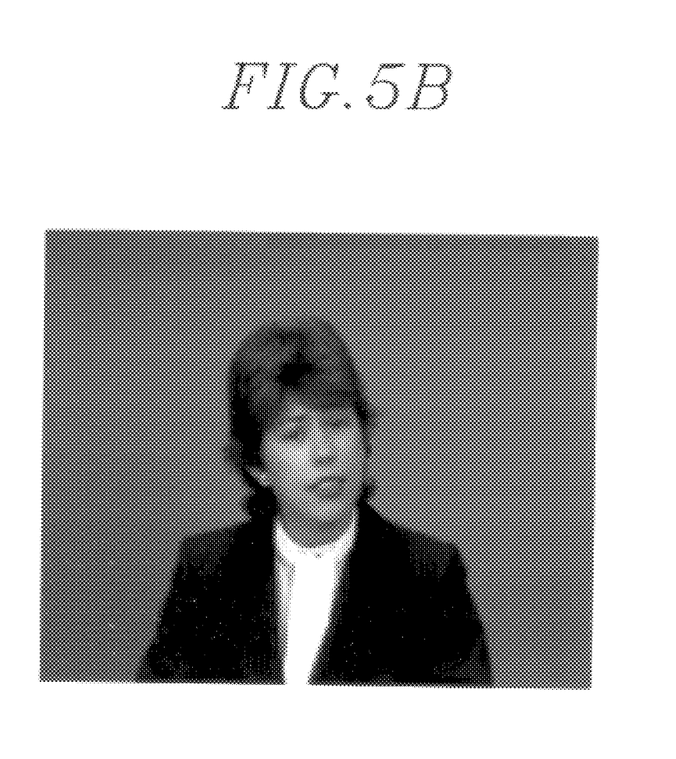

At the feature point selection block 210, the set of feature points are selected from a multiplicity of pixels contained in the reconstructed reference frame, each of the feature points is defined in terms of the position of a pixel. An exemplary current frame and a reconstructed reference frame are shown in FIGS. 5A and 5B.

Figure 6A:
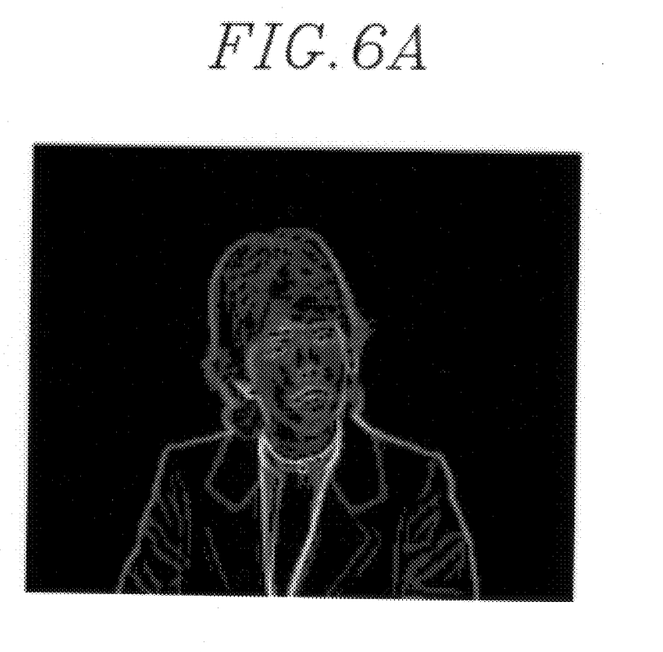
FIGS. 6A to 6E describe exemplary diagrams for showing the feature point selecting operation in accordance with the present invention.

Referring to FIGS. 6A to 6E, there are shown explanatory diagrams depicting a feature point selecting process in accordance with the present invention. As shown in FIG. 6A, edges are detected in the reconstructed reference frame $\hat{p}(x,y)$ shown in FIG. 5B, by using a known Sobel edge detector (see, e.g, A. K. Jain, "Fundamentals of Digital Image Processing", 1989, Prentice-Hall International). The output $|\nabla \hat{p}(x,y)|$ from the Sobel operator is compared with a predetermined threshold Te. The predetermined threshold Te is preferably selected as 6 in accordance with the present invention. If the output value $|\nabla \hat{p}(x,y)|$ from the Sobel operator is less than the predetermined threshold Te, the output value $|\nabla \hat{p}(x,y)|$ is set to 0. Otherwise, the output value $|\nabla \hat{p}(x,y)|$ may be unchanged. Therefore, an edge image signal eg(x,y) shown in FIG. 6A is defined as follows:

$$eg(x, y) = \begin{cases} 0, & \text{if } |\nabla \hat{p}(x, y)| < Te \\ |\nabla \hat{p}(x, y)|, & \text{otherwise} \end{cases}$$

Figure 6B:
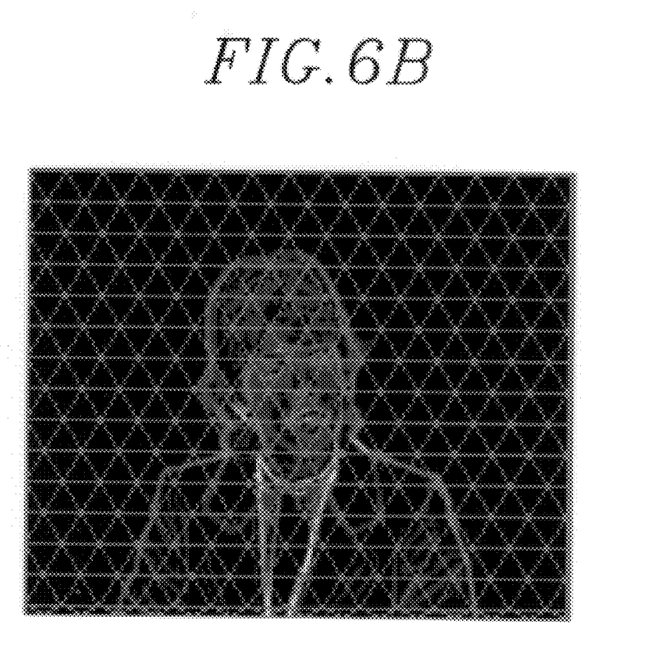
Figure 6C:
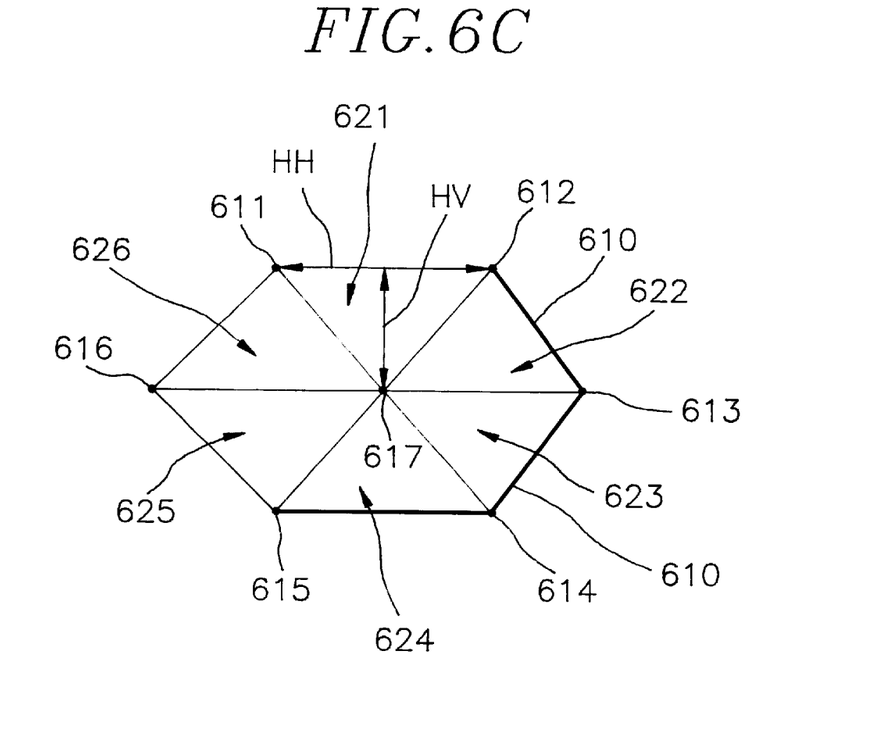

In a preferred embodiment of the present invention, the feature points are determined by using a grid technique employing a hexagonal grid having a plurality of overlapping hexagons as shown in FIG. 6B. As shown in FIG. 6C, a hexagon 610 is defined by line segments connecting seven grid points 611 to 617. The grid point 617 contained in a hexagon 610 encompasses more neighboring grid points 611 to 616 than a tetragon, thereby allowing the feature points to be more effectively organized. The hexagon 610 includes six non-overlapping triangles 621 to 626 and the grid points 611 to 617 are the vertices of triangles 621 to 626. The resolution of the hexagon 610 is defined by lines HH and HV, which, in accordance with the present invention, are preferably set to 13 and 10, respectively.

Figure 6D:
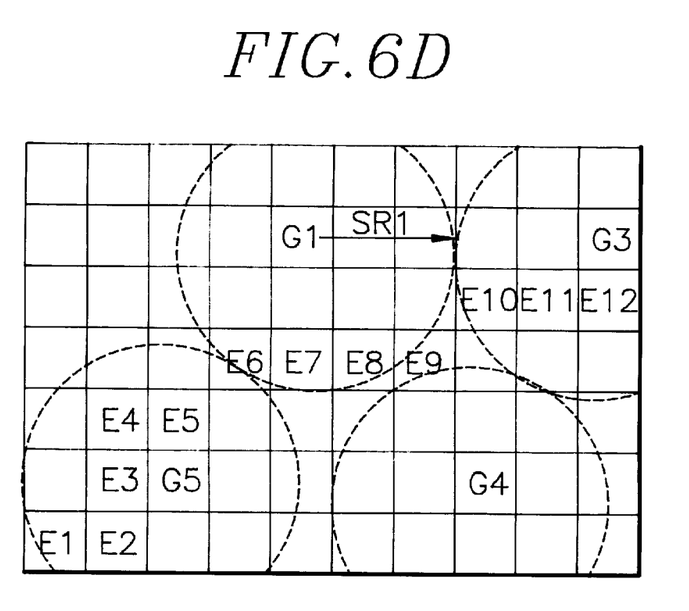

Referring to FIG. 6D, for each of the grid points, e.g., G1 to G4, non-overlapping searching ranges, e.g., SR1 to SR4 is set. An edge point, e.g., E7 located in the searching range SR1 becomes a feature point for the grid point e.g., G1, if the summation value of eight pixels surrounding the edge point, e.g., E7 is maximum. Therefore, the feature point Di may be represented as follows:

$$D_i = \left\{(x, y) \middle| \text{Max} \sum_{k=-1}^{1} \sum_{l=-1}^{1} EG(x+k, y+l)\right\} \quad \text{Eq. 2}$$

wherein EG(x,y) is a value of the edge point contained in the search region SRi and i is a positive integer.

The set of feature points is determined by using Eq. 2 wherein the set of feature points includes a grid point overlapping on an edge point, an edge point being located in the non-overlapping searching region SRi and having the maximum summation value of its surrounding pixel points, and said grid point having no edge point contained in its non-overlapping searching range.

If more than one edge point with the equal maximum summation value exist, then the edge point nearest to the grid point is selected as a feature point.

Figure 6E:
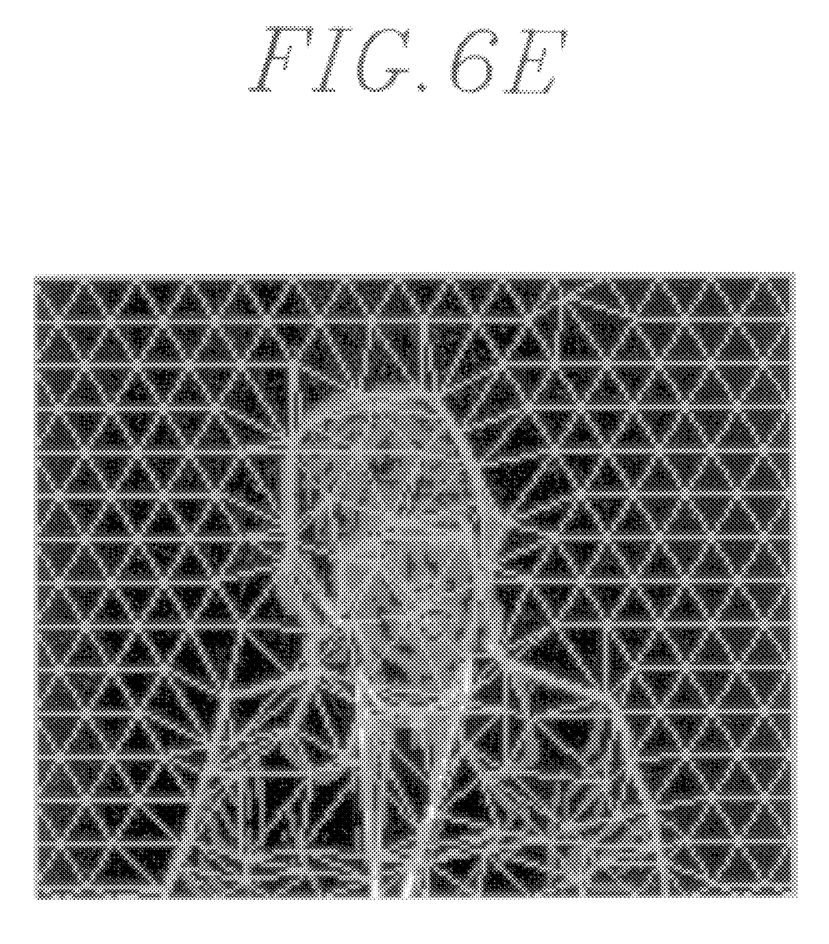

When the set of feature points is determined, the hexagonal grids shown in FIG. 6B is deformed as a hexagonal feature point grid shown in FIG. 6E. After the hexagonal feature point grid is determined, the set of feature points is coupled to the motion vector search block 230 shown in FIG. 4 which serves to detect a set of motion vectors thereof.

In accordance with the present invention, a convergence process employing an affine transform is used for searching the set of motion vectors.

Figure 7A:
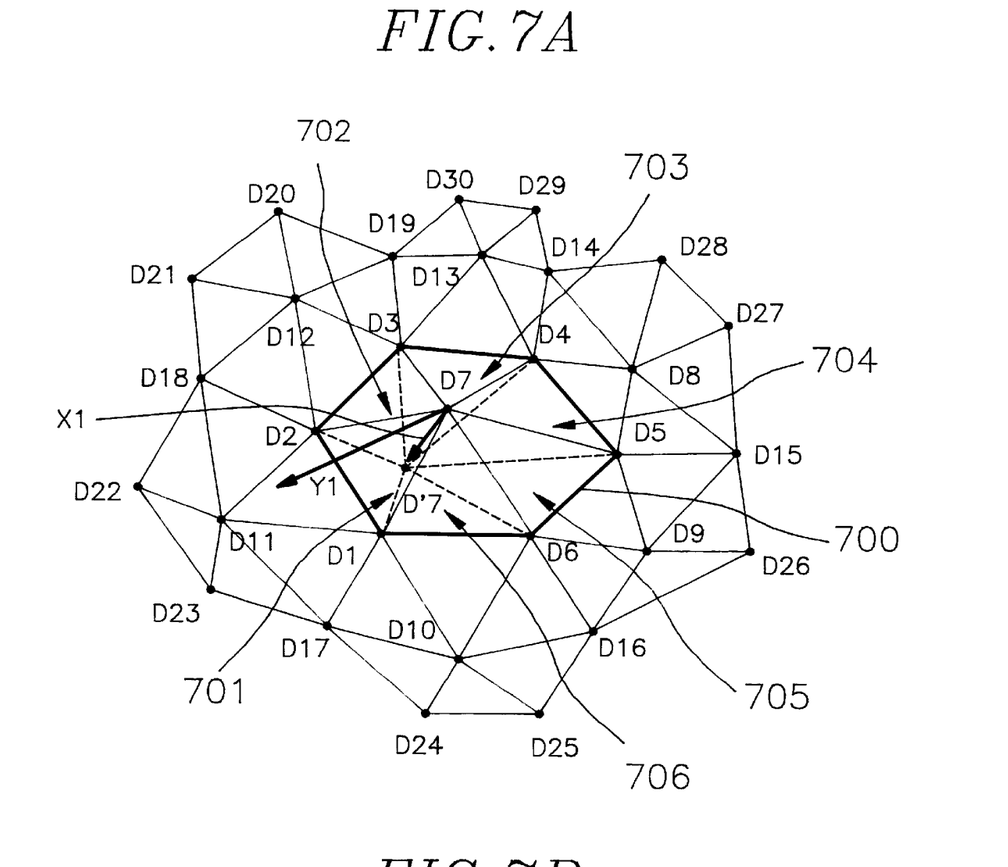
FIGS. 7A and 7B illustrate an explanatory diagram describing the motion vector searching process in accordance with the present invention.
Figure 7B:
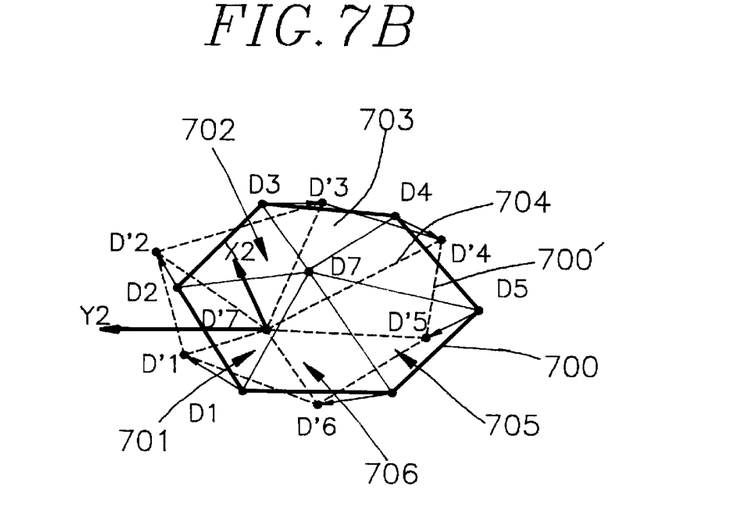

Referring to FIGS. 7A and 7B, there is an exemplary diagram illustrating the motion vector searching process in accordance with the present invention. A set of quasi-feature point is determined in the current frame by using the set of feature points wherein each of the feature points in the reconstructed reference frame is mapped to the corresponding quasi-feature point in the current frame. For each of the quasi-feature points, e.g., D1 to D30, the initial motion vector is set to (0,0).

When a quasi-feature point, e.g., D7 is then assigned or established as a subject quasi-feature point to be processed for estimating its motion vector, a subject current polygon 700 is used in the convergence process. The subject current polygon 700 is defined by line segments connecting the subject quasi-feature points D7 and its neighboring quasi-feature points, e.c., D1 to D6 which surround the subject quasi-feature point D7. The current polygon 700 includes six non-overlapping triangles 701 to 706, wherein the subject quasi-feature point is located on a common vertex of the triangles.

A predetermined number of candidate motion vector are sequentially then added to the initial motion vector of the quasi-feature point D7, wherein the predetermined number of candidate motion vectors are selected preferably in the range from 0 to ±7, horizontally and vertically, and the candidate motion vector $\overline{D7Y1}$ is not allowed since the triangle 701 is reversed. A candidate motion vector $\overline{D7X1}$ is added to the initial vector of the subject quasi-feature point D7 without changing the initial motion vectors of its six neighboring feature points D1 to D6 in order to produce a updated initial motion vector $\overline{D7D'7}$. Therefore, the updated initial motion vector $\overline{D7D'7}$ represents a displacement between the subject quasi-feature point D7 and a candidate quasi-feature point D'7.

A predicted position for each of the pixels contained in the subject current polygon 700 is determined on the original reference frame by using the updated initial motion vector and the initial vectors of the neighboring quasi-feature points.

Thereafter, each of the pixel positions contained in the subject current polygon 700 is interpolated by a pixel value on the original reference frame corresponding to the predicted position to form a predicted subject current polygon. In accordance with a preferred embodiment of the present invention, this process is performed by a known affine transform at each of the triangles, e.g., 701 which has the three feature point, e.g., D1, D2, D7, as its vertices. The affine transform is defined as follows:

$$\begin{bmatrix} x' \\ y' \end{bmatrix} = \begin{bmatrix} a & b \\ c & d \end{bmatrix} \cdot \begin{bmatrix} x \\ y \end{bmatrix} + \begin{bmatrix} e \\ f \end{bmatrix} \quad \text{Eq. 3}$$

wherein (x,y) represents the x and y coordinates of a pixel within the predicted subject current polygon; (x',y') denotes the coordinates of a predicted position on the original reference frame; and a to f are affine transform coefficients.

The six mapping parameters a, b, c, d, e, f are uniquely determined by using the motion vectors of the three quasi-feature points, e.g., D1, D2, D7. Once the affine transform coefficients are known, each of the remaining pixels in the triangle 701 can be mapped onto a position in the original reference frame. Because the obtained predicted position (x',y') of the original reference frame is not a set of integers in most cases, a known bilinear interpolation technique is used to calculate the interpolated gray level at the predicted position (x',y'). The affine mapping process is applied to the triangles 701 to 706, independently. The predicted subject current polygon for the candidate motion vector then is obtained.

The predicted subject current hexagon is then compared with the current hexagon 700 and it is checked if a peak signal to noise ratio(PSNR) of the predicted subject current hexagon and the current hexagon is increased. If this is the case, the initial motion vector (0,0) of the subject quasi-feature point D7 is updated with the updated initial motion vector $\overline{D7D'7}$.

For remaining candidate motion vectors, the process is repeated. The above process is also performed at all of the quasi-feature points contained in said current frame in one iteration.

Referring to FIG. 7B, assuming that the one iteration is completed, the quasi-feature point D7 is set to a subject quasi-feature point; and the updated initial motion vectors for the neighboring quasi-feature points D1 to D6 are $\overline{D1D'2}$, $\overline{D2D'2}$, $\overline{D3D'3}$, $\overline{D4D'4}$, $\overline{D5D'5}$ and $\overline{D6D'6}$; and, in a similar manner, the predetermined candidate motion vectors are sequentially added to the initial vector of the subject quasi-feature point $\overline{D7D'7}$. For example, the candidate motion vector $\overline{D'7X2}$ is added to the initial vector of the subject quasi-feature point $\overline{D7D'7}$ without changing the initial motion vectors of its six neighboring feature points $\overline{D1D'1}$, $\overline{D2D'2}$, $\overline{D3D'3}$, $\overline{D4D'4}$, $\overline{D5D'5}$, $\overline{D6D'6}$. Therefore, the updated initial motion vector becomes $\overline{D7X2}$. The predetermined number of candidate motion vectors, as described above, are selected preferably in the range from 0 to ±7, horizontally and vertically, and the candidate motion vector $\overline{D7Y2}$ is not allowed since the triangle 701 is reversed.

A predicted position for each of the pixels contained in the subject current polygon 700 is determined on the original reference frame by using the updated motion vector $\overline{D7X2}$ the initial vectors of the neighboring quasi-feature points $\overline{D1D'1}$, $\overline{D2D'2}$, $\overline{D3D'3}$, $\overline{D4D'4}$, $\overline{D5D'5}$, $\overline{D6D'6}$. Thereafter, each of the pixel positions contained in the subject current polygon 700 is interpolated by a pixel value on the original reference frame corresponding to the predicted position to from a predicted subject current polygon 700' (represented by a phantom line shown in FIG. 7B).

The predicted subject current hexagon 700' is then compared with the current hexagon and it is checked if the PSNR of the predicted subject current hexagon and the current hexagon is increased. If this is the case, the initial motion vector of the subject quasi-feature point $\overline{D7D'7}$ is updated with the updated initial motion vector $\overline{D7X2}$.

For remaining candidate motion vectors, the process is repeated. The above process is also performed at all of the quasi-feature points contained in the current frame in a second iteration.

This process is also performed with respect to all of the quasi-feature points several times until the convergence is reached. Preferably, the iteration for the process is set to five times, because, in the most cases, the motion vectors converge before the 5th iteration.

As can be seen from the above, in the convergence process, a displacement of each of the feature points is given to a notion vector thereof and the six triangles of each of the hexagon are affine-transformed independently using the displacements of their vertex feature points. If the displacement provides a better PSNR, the motion vector of the subject feature point is sequentially updated. Therefore, the convergence process is very efficient in the matching process to determine the predicted image as close as possible to the original image having zooming, rotation or scaling objects.

In accordance with a preferred embodiment of the present invention, for hardware implementation, this process can be accomplished in three steps. The quasi-feature points denoted as D1, D3, and D5 shown in FIG. 7A, which form non-overlapping subject current polygons, are first processed simultaneously by using each of the 6 neighboring feature points (D2, D7, D6, D10, D11, D17), (D2, D4, D7, D12, D13, D19), (D4, D6, D7, D8, D9, D15). The same process is repeated next for the points D2, D4 and D6. As the last step, the remaining points D7, D8 and D9 are finally processed.

Referring back to FIG. 4, the obtained motion vectors for all of the quasi-feature points are then coupled as the set of motion vector for all of the feature points to the motion compensation block 240 which serves to generate a predicted current frame signal through the use of the reconstructed reference frame. That is, the predicted current frame signal is obtained by the affine transform employing the reconstructed previous frame and the obtained motion vectors. It can be seen from the above, this is the same mapping using the affine transform used for the motion vector search process, except that the reconstructed reference frame is used instead of the original reference frame, because a decoder system (not shown) has only a reconstructed reference frames.

On the other hand, since the encoding system employing this feature point based motion compensation produces a considerably good image with the motion vectors only, the difference or error signal between the current frame and the predicted current frame may not be transmitted.

As may be seen from the above, it is readily appreciated that the inventive encoder system employing the feature point based motion compensation can obtain a reliable set of motion vectors, thereby improving the coding efficiency.

The feature point based motion compensation algorithm is based on image features, and affine transformation is employed to compensate for rotation and zooming of the object. In most cases, the motion compensated images have a higher PSNR with good subjective quality. If the motion prediction fails in cases of a large scale motion, the error image can be coded and transmitted using DCT with a large quantization step. Specifically, a good subjective quality is obtained by using the inventive encoding system at 24 Kbps. Further, since the positions of feature points change from frame to frame, the inventive encoder system employs, as the reference frame, a reconstructed previous frame which exists both in the encoder and in the decoder so that it is not necessary to transmit the position information of feature points. Furthermore, this pixelwise motion compensation employed in the present encoding system produces a better subjective quality than the block based motion compensation, because it can compensate the zooming, rotation and scaling of objects by using the affine transform with the motion vectors only.

While the present invention has been shown and described with reference to the particular embodiments, it will be apparent to those skilled in the art that many changes and modifications may be made without departing from the spirit and scope of the invention as defined in the appended claims.

What is claimed is:

1. A method for detecting a set of motion vectors between a current frame and a reference frame of video signals by employing a feature point based motion estimation approach, wherein the reference frame includes a reconstructed reference frame and an original reference frame, which comprises the steps of:

(a) selecting a set of feature points from pixels contained in the reconstructed reference frame wherein the set of feature points forms a polygonal grid having a plurality of overlapping polygons;

(b) determining a set of quasi-feature points on the current frame based on the set of feature points;

(c) assigning a set of initial motion vectors for the set of quasi-feature points, wherein each of the initial motion vectors is set to (0,0);

(d) appointing one of the quasi-feature points as a subject quasi-feature point, wherein the subject quasi-feature point has N number of neighboring quasi-feature points which form a subject current polygon defined by line segments connecting the subject quasi-feature point and said N number of neighboring quasi-feature points, N being a positive integer;

(e) sequentially adding the initial motion vector of the subject quasi-feature point to M number of candidate motion vectors with to produce M number of updated initial motion vectors, M being a positive integer, wherein said M number of candidate motion vectors cover a predetermined region in the subject current polygon and the initial motion vectors of said neighboring feature points are fixed;

(f) determining a predicted position on the original reference frame for each pixel contained in the subject current polygon based on each of the M number of updated initial motion vectors for the subject quasi-feature point and said N number of the initial motion vectors of the neighboring quasi-feature points;

(g) providing a predicted pixel value for said each pixel based on the predicted position from the original reference frame to form M number of predictive subject current polygons;

(h) calculating the difference between the current polygon and each of the predicted subject current polygons to produce M number of peak signal to noise ratios (PSNR's)

(i) selecting one of the updated motion vectors as a selected updated motion vector, which entails a predicted subject current polygon having a maximum PSNR, to update the initial motion vector of the subject quasi-feature point with the selected updated motion vector;

(j) repeating the steps (d) to (i) until all of the initial motion vectors are updated;

(k) repeating the step (j) until said repeating is carried out for a predetermined number of times; and (n) establishing the set of initial vectors as the set of motion vectors, to thereby determine the set of motion vectors.

2. The method as recited in claim 1, wherein the step (a) includes the steps of:

(a1) detecting an edge image of the reconstructed reference frame, wherein the edge image eg(x,y) is defined as follows $$eg(x, y) = \begin{cases} 0, & \text{if } |\nabla \hat{p}(x, y)| < Te \\ |\nabla \hat{p}(x, y)|, & \text{otherwise} \end{cases}$$

where $\hat{p}(x,y)$ represents the reference frame; $|\nabla \hat{p}(x,y)|$ denotes an output from a known Sobel operator; and Te is a predetermined threshold;

(a2) establishing a polygonal grid on the edge image wherein the polygonal grid includes a number of grid points to form the plurality of overlapping polygons;

(a3) assigning a non-overlapping search range for each of the grid points; and (a4) determining the set of feature points wherein the set of feature points includes a grid point overlapping an edge point, said edge point being located in the non-overlapping search range and having a maximum summation value of its surrounding pixel points, and said grid point having no edge point contained in its non-overlapping search range.

3. The method as recited in claim 1, wherein the set of feature points includes an edge point nearest to the polygonal grid when more than one edge point having the equal maximum summation value appear in the search range.

4. The method as recited in claim 3, wherein the polygon is a hexagon and N is 6.

5. The method as recited in claim 4, wherein the subject current hexagon includes six triangles defined by line segments connecting the subject quasi-feature point; and its neighboring quasi-feature points and the steps (f) and (g) are performed by using a known affine transform.

6. The method as recited in claim 5, wherein the number of surrounding pixel points is 8; the predetermined repeating number is 5; and the predetermined threshold is 6.

7. The method as recited in claim 6, wherein the predetermined region is in a range from −7 to 7, horizontally and vertically.

8. The method as recited in claim 7, wherein the feature point $D_i$ is defined as follows $$D_i = \left\{ (x, y) \middle| \text{Max} \sum_{k=-1}^{1} \sum_{l=-1}^{1} EG(x+k, y+l) \right\}$$

wherein EG(x,y) is a value of the edge point contained in the search region and i is a positive integer.

9. An apparatus, for use in a video encoding system, for detecting a set of motion vectors between a current frame and a reference frame of video signals by employing a feature point based motion estimation, wherein the reference frame includes a reconstructed reference frame and an original reference frame, which comprises:

first selection means for selecting a set of pixels from the reconstructed reference frame as a set of feature points, wherein the set of feature points forms a polygonal grid having a plurality of overlapping polygons;

means for determining a set of quasi-feature points on the current frame corresponding to the set of feature points;

memory means for storing a set of initial motion vectors for the set of quasi-feature points, wherein each of the initial motion vectors is set to (0,0);

second selection means for selecting L number of subject quasi-feature points from the set of quasi-feature points, wherein each of the subject quasi-feature points has N number of neighboring quasi-feature points which form a non-overlapping subject current polygon defined by line segments connecting the subject quasi-feature point and said N number of neighboring quasi-feature points, said L and N being positive integers;

adder means for adding the initial motion vector of each of the subject quasi-feature points to M number of candidate motion vectors to generate M number of updated initial motion vectors for each of the subject quasi-feature points, M being a positive integer, wherein said M number of candidate motion vectors cover a predetermined region in each of the non-overlapping subject current polygons and the initial motion vectors of the neighboring feature points for each of the subject quasi-feature points are fixed;

means for determining a predicted position on the original reference frame for each pixel contained in each of the non-overlapping subject current polygons based on each of the updated initial motion vectors and the initial motion vectors of the corresponding neighboring quasi-feature points;

means for obtaining a predicted pixel value from the original reference frame based on the predicted position to thereby form M number of predicted subject current polygons for each of the non-overlapping subject current polygons;

means for calculating the differences between each of the non-overlapping subject current polygons and the corresponding M number of predicted subject current polygons to produce M number of peak signal to noise ratios(PSNR's) for each of the non-overlapping subject current polygons;

third selection means for selecting one of the updated initial vectors, for each of the subject quasi-feature points, as a selected updated initial motion vector which entails the predicted subject current polygon having a maximum PSNR to produce L number of selected updated initial motion vectors;

means or updating the initial motion vector for each of the subject quasi-feature points stored in the memory means with the corresponding selected updated initial motion vector; and means for retrieving the set of initial motion vectors from the memory means as the set of motion vectors when all of the initial motion vectors are updated by a predetermined number of times.

10. The apparatus as recited in claim 9, wherein the first selection means includes:

means for detecting an edge image of the reconstructed reference frame, wherein the edge image eg(x,y) is defined as follows $$eg(x, y) = \begin{cases} 0, & \text{if } |\nabla \hat{p}(x, y)| < Te \\ |\nabla \hat{p}(x, y)|, & \text{otherwise} \end{cases}$$

where p̂(x,y) represents the reference frame; $|\nabla \hat{p}(x,y)|$ denotes an output from a known Sobel operator; and Te is a predetermined threshold;

means for providing a polygonal grid on the edge image wherein the polygonal grid includes a number of grid points to form the plurality of overlapping polygons;

means for establishing a non-overlapping search range for each of the grid points; and means for determining the set of feature points wherein the set of feature points includes a grid point overlapping an edge point, said edge point being located in the search rangeand having a maximum summation value of its surrounding pixel points, said grid point having no edge point contained in its non-overlapping searching range.

11. The method as recited in claim 10, wherein the set of feature points includes an edge point nearest to the polygonal grid when more than one edge point having the equal maximum summation value appear in the search range.

12. The apparatus as recited in claim 11, wherein the polygon is a hexagon and N is 6.

13. The apparatus as recited in claim 12, wherein the subject current hexagon includes six triangles defined by line segments connecting the subject quasi-feature point and its neighboring quasi-feature points; and means for determining the predicted position includes a known affine transformer.

14. The apparatus as recited in claim 13, wherein the number of surrounding pixel points is 8; the predetermined repeating number is 5; and the predetermined threshold is 6.

15. The apparatus as recited in claim 14, wherein the predetermined region is in a range from −7 to 7, horizontally and vertically.

16. An apparatus for encoding a digital video signal to reduce the transmission rate of the digital video signal, said digital video signal having a plurality of frames including a current frame and a reference frame, which comprises:

first memory means for storing a reconstructed reference frame of the digital video signal;

second memory means for storing an original reference frame of the digital video signal;

first motion compensation means for detecting a number of motion vectors between the current frame and the reconstructed reference frame by using a block based motion estimation and for generating a first predicted current frame based on the number of motion vectors and the reconstructed reference frame;

first selection means for selecting a set of pixels from the reconstructed reference frame as a set of feature points, wherein the set of feature points forms a polygonal grid having a plurality of overlapping polygons;

means for determining a set of quasi-feature points on the current frame corresponding to the set of feature points;

memory means for storing a set of initial motion vectors for the set of quasi-feature points, wherein each of the initial motion vectors is set to (0,0);

second selection means for selecting L number of subject quasi-feature points from the set of quasi-feature points, wherein each of the subject quasi-feature points has N number of neighboring quasi-feature points which form a non-overlapping subject current polygon defined by line segments connecting the subject quasi-feature point and said N number of neighboring quasi-feature points, said L and N being positive integers;

adder means for adding the initial motion vector of each of the subject quasi-feature points to M number of candidate motion vectors to generate M number of updated initial motion vectors for each of the subject quasi-feature points, M being a positive integer, wherein said M number of candidate motion vectors cover a predetermined region in each of the non-overlapping subject current polygons and the initial motion vectors of the neighboring feature points for each of the subject quasi-feature points are fixed;

means for determining a predicted position on the original reference frame for each pixel contained in each of the non-overlapping subject current polygons based on each of the updated initial motion vectors and the initial motion vectors of the corresponding neighboring quasi-feature points;

means for obtaining a predicted pixel value from the original reference frame based on the predicted position to thereby form M number of predicted subject current polygons for each of the non-overlapping subject current polygons;

means for calculating the differences between each of the non-overlapping subject current polygons and the corresponding M number of predicted subject current polygons to produce M number of peak signal to noise ratios(PSNR's) for each of the non-overlapping subject current polygons;

third selection means for selecting one of the updated initial vectors, for each of the subject quasi-feature points, as a selected updated initial motion vector which entails the predicted subject current polygon having a maximum PSNR to produce L number of selected updated initial motion vectors;

means for updating the initial motion vector for each of the subject quasi-feature points stored in the memory means with the corresponding selected updated initial motion vector;

means for retrieving the set of initial motion vectors from the memory means as the set of motion vectors when all of the initial motion vectors are updated by a predetermined number of times; and means for selectively providing the number of motion vectors and the first predicted current frame or the set of motion vectors and the second predicted current frame as selected motion vectors and the predicted current frame;

means for transform-coding an error signal representing the difference between the selectively provided predicted current frame and the current frame to produce a transform coded error signal; and means for statistically coding the transform coded error signal and the selected motion vectors to produce an encoded video signal to be transmitted.

17. The apparatus as recited in claim 16, wherein the first selection means includes:

means for detecting an edge image of the reconstructed reference frame, wherein the edge image eg(x,y) is defined as follows $$eg(x, y) = \begin{cases} 0, & \text{if } |\nabla \hat{p}(x, y)| < Te \\ |\nabla \hat{p}(x, y)|, & \text{otherwise} \end{cases}$$

where $\hat{p}(x,y)$ represents the reference frame; $|\nabla \hat{p}(x,y)|$ denotes an output from a known Sobel operator; and Te is a predetermined threshold;

means for providing a polygonal grid on the edge image wherein the polygonal grid includes a number of grid points to form the plurality of overlapping polygons;

means for setting a non-overlapping search range for each of the grid points; and means for determining the set of feature points wherein the set of feature points includes a grid point overlapping an edge point, said edge point being located in the search range and having a maximum summation value of its surrounding pixel points, and said grid point having no edge point contained in its non-overlapping search range.

18. The apparatus as recited in claim 17, wherein the polygon is a hexagon, N is 6, the subject current hexagon includes six triangles defined by line segments connecting the subject quasi-feature point and its neighboring quasi-feature points; and means for determining the predicted position includes a known affine transformer.

19. The apparatus as recited in claim 18, wherein the number of surrounding pixel points is 8, the predetermined repeating number is 5; and the predetermined threshold is 6.

20. The apparatus as recited in claim 19, wherein the predetermined region is in a range from −7 to 7, horizontally and vertically.

* * * * *